No. 653,424. Patented July 10, 1900.
A. D. LUNT.
SPEED EQUALIZING DEVICE.
(Application filed Apr. 30, 1900.)
(No Model.)
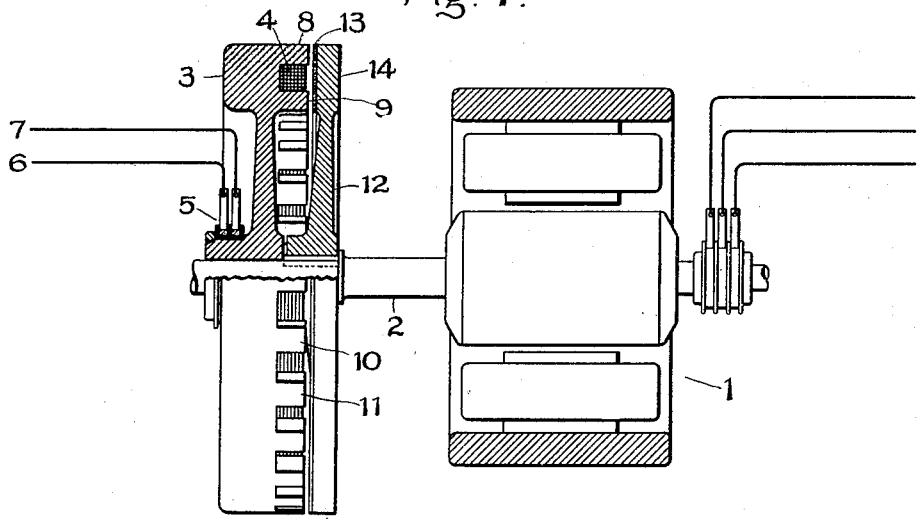
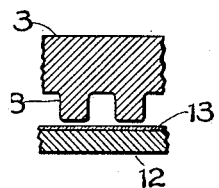
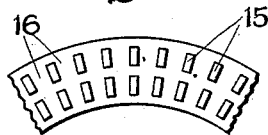
Witnesses:
Inventor,
Alexander D. Lunt,
by Albert G. Davis,
Atty.
THE NORRIS PETERS CO., PHOTO-LITHO., WASHINGTON, D. C.

UNITED STATES PATENT OFFICE.

ALEXANDER D. LUNT, OF SCHENECTADY, NEW YORK, ASSIGNOR TO THE GENERAL ELECTRIC COMPANY, OF NEW YORK.

SPEED-EQUALIZING DEVICE.

SPECIFICATION forming part of Letters Patent No. 653,424, dated July 10, 1900.

Application filed April 30, 1900. Serial No. 14,816. (No model.)

*To all whom it may concern:*

Be it known that I, ALEXANDER D. LUNT, a citizen of the United States, residing at Schenectady, county of Schenectady, State of New York, have invented certain new and useful Improvements in Speed-Equalizing Devices, (Case No. 1,265,) of which the following is a specification.

My present invention relates to a means for equalizing the speed of shafts, machines, or other rotating bodies, and is particularly useful for preventing the shunting of synchronous motors, rotary converters, or other synchronously-operating dynamo-electric machines. In the specific embodiment of the invention hereinafter described I make use of a fly-wheel or other energy-storing device of similar character moving normally in synchronism with the device whose speed is to be equalized and operatively connected thereto through the medium of an electrical energy-absorbing device which is brought into action upon any deviation from synchronism. When my invention is applied to a dynamo-electric machine, I prefer to mount the fly-wheel loosely upon the shaft or an extension thereof and to form upon or near the periphery of the fly-wheel a series of electromagnets, which act upon a Foucault disk or similar closed circuit mounted in fixed relation to the shaft. In normal operation the friction of the fly-wheel on its bearings will generally be sufficient to maintain it in rotation in fixed relation to the Foucault disk. When, however, the speed tends to fluctuate, the fly-wheel owing to its large inertia will continue its regular rate of rotation, thereby causing a relative movement between the fly-wheel and its shaft and a consequent shifting of lines of force along the Foucault disk, which by generating electric currents produces a powerful braking action and so restrains the shaft and parts to which it is connected from fluctuating in speed either above or below a regular rate of rotation. The Foucault disk or similar closed electric circuit dissipates electrical energy produced by relative motion between itself and the fly-wheel carrying the electromagnets, thereby acting as a damping device, the effect of which is the more powerful the greater the tendency to deviation from normal speed.

My invention will best be understood with reference to the following description, taken in connection with the accompanying drawings, while its scope will be pointed out in the claims appended hereto.

In the drawings, Figure 1 represents the application of my invention to a three-phase synchronous motor, Figs. 2 and 3 representing details.

The synchronous motor is represented, generally speaking, at 1, and as it possesses no points of novelty it needs no detailed description. It represents merely one of many useful applications of which my invention is capable.

Mounted loosely upon the shaft 2 of the motor is a fly-wheel 3, one side of the rim of which is provided with an annular groove, in which is placed a magnetizing-coil 4 of corresponding shape, the terminals of the coil being brought down and connected to collector-rings, (indicated at 5.) Brushes bear upon these collector-rings and are connected to leads 6 7, to which direct current is to be supplied from any suitable or convenient source. The rim of the fly-wheel is notched at regular intervals around those parts adjacent to the inner and outer circumference of the magnetizing-coil 4, leaving thereby a series of regularly-arranged pole-pieces, two of which are shown in section at 8 and 9 and in outline at 10 11, &c.

Keyed upon the shaft 2, in proximity to the fly-wheel 3, is a wheel or disk 12 or other suitable member carrying a plate or plates 13, of copper or other good conducting material, shaped in the form of an annulus and arranged about the outer portion of the disk 12 in close proximity to the projecting pole-pieces 8 9. This plate or plates constitutes a Foucault disk or closed circuit in which currents are generated by reason of its relative motion with respect to the opposing pole-pieces. The outer edge 14 of the supporting disk or wheel is made of magnetic material and serves to complete the magnetic circuit for the lines of force passing between the outer row of pole-pieces and the inner row and by reason of its high permeability greatly increases the flux, thereby correspondingly increasing the damping effect of the arrangement. It is of course obvious that in practice the air-gap between the magnets and the opposing disk should be as small as possible in order to reduce the reluctance of the magnetic circuit. In order to still further reduce the magnetic reluctance of the circuit, I may form the closed circuit carried by the wheel or disk 12 by casting highly-conducting metal about its edge in the position occupied by the plates 13, the edge 14 of the disk being, however, in this case provided with numerous radially-extending teeth of such a depth as to come flush with the surface of the conducting metal. After the conducting metal has been cast about the teeth the surface may be machined off smooth. The surface will then be substantially as shown in Fig. 3, which represents a face view of the same, the radially-extending teeth of magnetic material being indicated at 15 and the highly-conducting metal surrounding them at 16. The metal 16 thus forms a sort of gridiron, the bars of which constitute closed circuits of low resistance, by reason of which powerful currents are generated.

As the object of the electromagnetic device described above is to produce a drag between the relatively-movable members and to produce as powerful a drag as possible, at the same time consuming energy, and thereby putting a restraining load upon the shaft 2, I prefer that the parts should not be laminated, since my object is to produce induced currents of as great volume as possible and not to economize energy. The gridiron arrangement of circuits indicated serves to direct the currents generated into proper channels, so as to have as great a reactive effect as possible upon the field-magnets.

What I claim as new, and desire to secure by Letters Patent of the United States, is—

1. The combination of a shaft, a fly-wheel loose thereon and an electromagnetic connection between the fly-wheel and shaft.

2. The combination of a shaft, a fly-wheel loose thereon, and electrical means for producing a drag between the fly-wheel and shaft.

3. The combination of a shaft, a relatively-rotatable fly-wheel, and electrical means for restraining such rotation.

4. The combination of a shaft or other device of variable speed, a fly-wheel capable of movement relatively thereto, and electrical means for restraining such movement.

5. The combination of a shaft or other device of variable speed, a moving mass of high inertia capable of movement relatively to said shaft or other device, and electrical means for restraining such relative movement.

6. The combination of a shaft or other device of variable speed, a moving mass possessing inertia and capable of movement relatively to said shaft or other device, and energy-consuming means exerting a torque between said mass and said shaft or other device approximately proportional to their deviation from synchronism.

7. The combination of a dynamo-electric machine, a fly-wheel loose on the shaft of the machine, and a closed conductor and a field-magnet one of which moves with the shaft and the other with the fly-wheel.

8. The combination of a dynamo-electric machine, a fly-wheel, and a closed conductor and a field-magnet one of which moves synchronously with the dynamo-electric machine and the other with the fly-wheel.

In witness whereof I have hereunto set my hand this 28th day of April, 1900.

ALEXANDER D. LUNT.

Witnesses:
BENJAMIN B. HULL,
MABEL E. JACOBSON.